Figure 1:
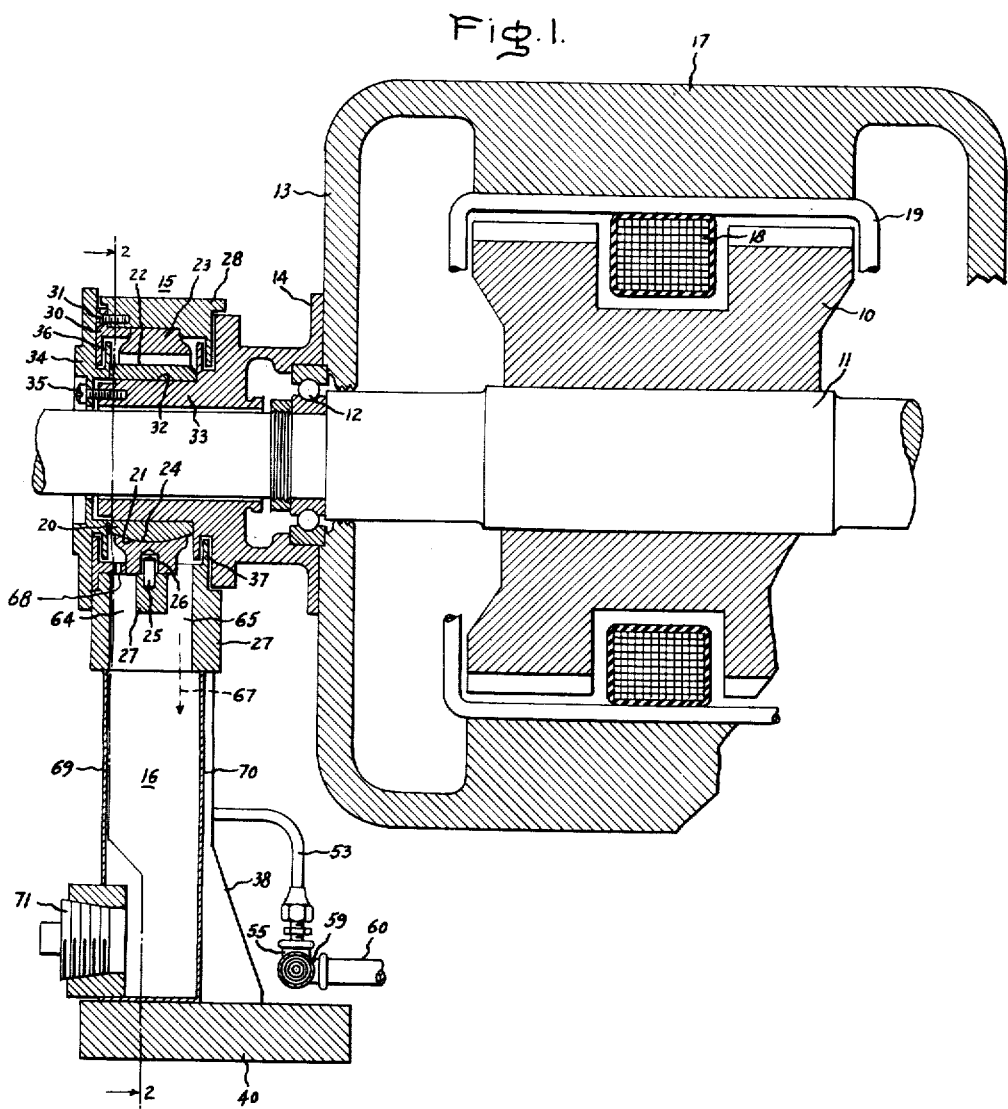

Inventor:
Phil S. Potts,
by Richard E. Hosley
His Attorney.

July 12, 1955  P. S. POTTS  2,712,965
DYNAMOMETER TRUNNION BEARING
Filed Sept. 14, 1951  3 Sheets-Sheet 3
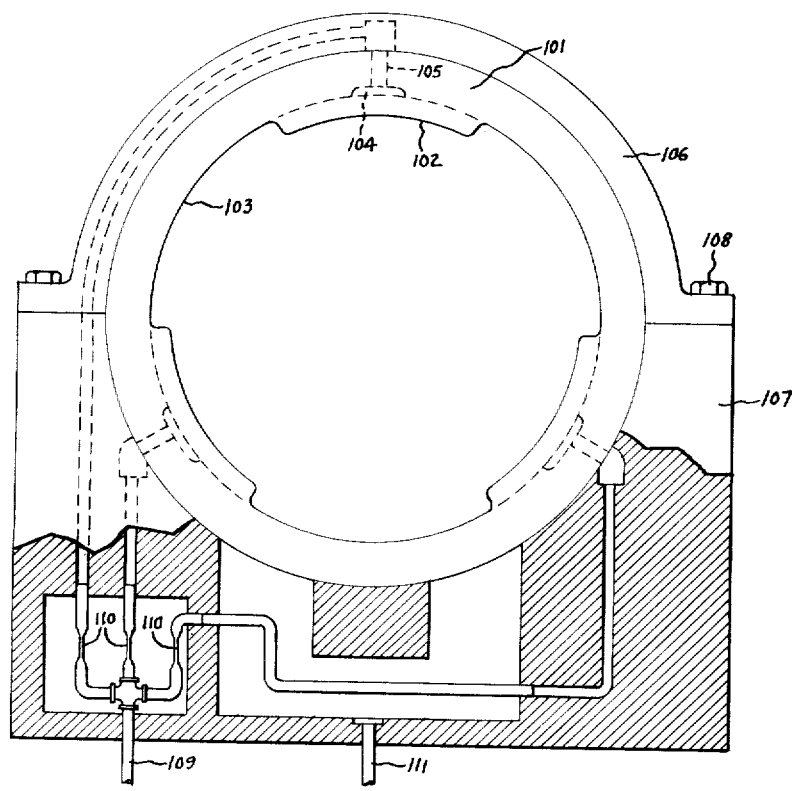
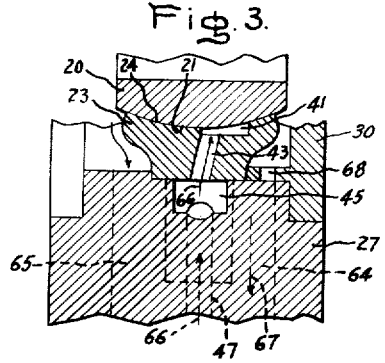 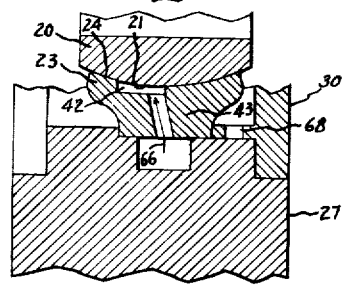
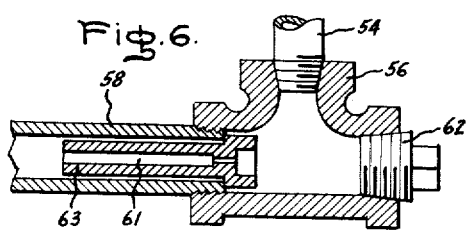
Inventor:
Phil S. Potts,
by Richard E. Hosley
His Attorney.

United States Patent Office 2,712,965
Patented July 12, 1955

2,712,965

DYNAMOMETER TRUNNION BEARING

Phil S. Potts, Fort Wayne, Ind., assignor to General Electric Company, a corporation of New York Application September 14, 1951, Serial No. 246,619

4 Claims. (Cl. 308—9)

My invention relates to force measuring instrument bearings and has particular significance in connection with dynamometer trunnion bearing mounting, alignment and lubrication.

A primary problem in the construction of dynamometers and other force measuring instruments has been the provision of means to eliminate the trunnion error which heretofore has rapidly increased with wear of mating surfaces. Unlike most machine bearings provided with members which are relatively rotatable during the greater part of their operating life, a dynamometer trunnion bearing is almost a stationary bearing since the cradled member rotates very little within its support and sometimes operates in the same position for long intervals. It has been known in the past to use ball or roller bearing in dynamometer trunnion supports, but in many applications this has not provided a satisfactory solution of the difficulties because it is primarily static rather than rolling friction which must be overcome and because conventional balls or rollers present only very small surfaces for dead weight support so that the heavy weight of the supported member causes deformation of the balls or rollers, thereby introducing inaccuracies into measurements subsequently made. Furthermore, conventional bearings, for example, of the sleeve or rocking metallic pad types, depend for lubrication upon the relative rotation of the mating bearing parts. Whenever a pair of ordinarily lubricated surfaces are pressed together by a load, the pressure tends to expel the lubricant from between the surfaces. In ordinary machinery, allowing the mating members to stand at rest for a short period of time is sufficient to expel so much of the lubricant as to allow the metallic surfaces to come into contact. It is a well known fact that heavy machinery offers great resistance when starting after standing idle even though soon thereafter the relatively moving surfaces tend to draw in lubricant by their motion even at the lowest velocities. While forced lubrication has been known in the past as an expedient to float a sleeve bearing member to make its lubrication independent of relative rotation, it has not heretofore been apparent how this principle could be applied to dynamometer trunnion bearings with their companion problems of self-alignment and restraint in an axial as well as a radial direction, and of limited freedom of movement in all directions to take care of tilting, axial thrust and unusual loads.

It is an object of the present invention to provide simple and inexpensive means for overcoming the above-mentioned difficulties.

A further object of the present invention is to provide in a machine for making force measurements, a trunnion bearing characterized by reduced friction, increased life, independence of lubrication upon rotation, and freedom of movement in any direction together with self-centering action.

A still further object of the present invention is to provide a dynamometer characterized by reduced measurement error irrespective of the age of the machine.

Another object of the present invention is to provide a novel bearing arrangement having automatic means for adjusting itself to changing positions of supported member with respect to supporting member.

In accordance with one aspect of my invention, in a force measuring instrument I eliminate the triple problems of lubrication of substantially stationary mating bearing surfaces, alignment restoration, and limited freedom of movement by providing mating bearing services of spherical and socket or otherwise convex-concave shape of the respective inner member outer periphery and outer member inner periphery and by providing indentations forming chambers in the periphery of one of these members. Lubricant under pressure is introduced to the chambers formed by the indentations to form fluid bearing pads for providing relatively large areas of maximum lubricant pressure exerting concentrated forces upon one bearing member with respect to the other. The mating bearing members are provided with a small clearance therebetween to allow limited movement in any direction with an adjustable resistance to small movements provided by lubricant leaking into the clearance from the pads. The cutout indentations are circumferentially spaced equidistant on either side of a vertical center so that fluid under pressure therein will tend to restore radial centering, particularly when supply passages leading to said chambers each have flow responsive restrictor means so that all may be supplied from a common source and resistance at one chamber will be accompanied by resistance in the restrictor means in the supply feed to the other chamber or chambers. The use of restricted pressure passages or tubes whose length to diameter ratio is great not only results in a large pressure drop within any restricting tube carrying a heavy flow, to give an automatic centering action to return the supported member to the radial center of the supporting member, but also makes total lift independent of oil temperature and viscosity. The chambers provided for forming the fluid pads are also offset axially (as well as radially) so that a centering action may also be achieved to restore the devices in axial alignment should there be any tendency of the supported member to move axially in one direction or the other with respect to the supporting member. The principles about to be disclosed are believed equally applicable where the concave outer bearing portion is either a supporting or a supported member.

Figure 2:
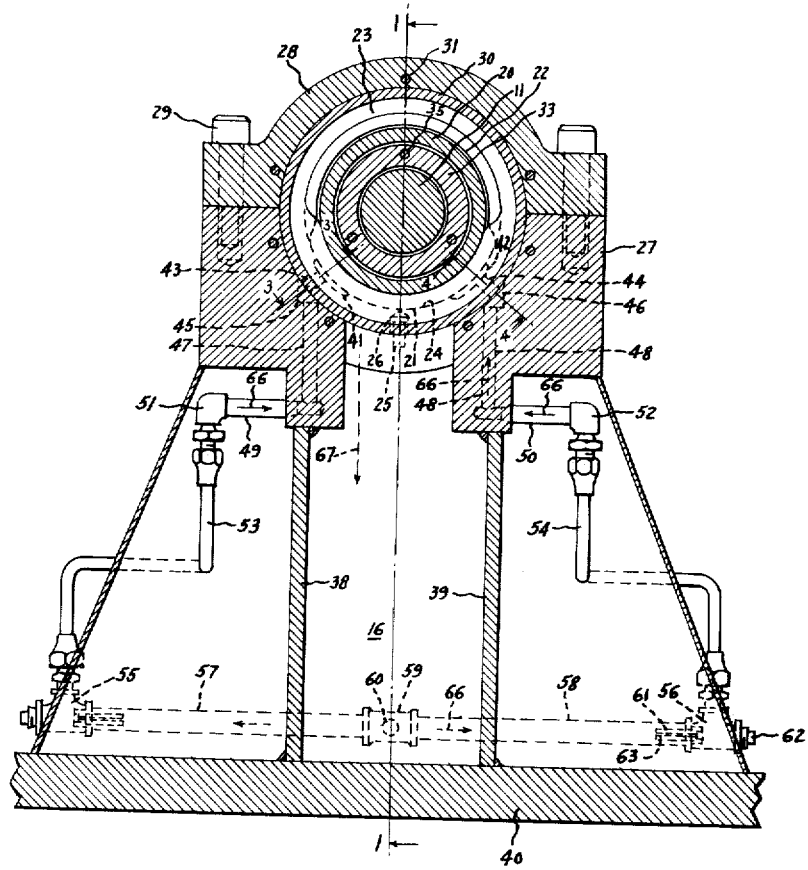

The features of my invention which I believe to be novel are set forth with particularity in the appended claims. My invention itself, however, both as to its organization and method of operation, together with further objects and advantages thereof may best be understood by reference to the following description taken in connection with the accompanying drawing in which Fig. 1 is a partial sectional elevation of a dynamometer having a trunnion bearing provided with an arrangement in accordance with the invention; Fig. 2 is a cross-sectional view taken on the line 2—2 of Fig. 1; Fig. 3 is a cross-sectional view taken on the line 3—3 of Fig. 2; Fig. 4 is a cross-sectional view taken on the line 4—4 of Fig. 2; Fig. 5 is an end view of a bearing outer race and pedestal support therefor illustrating a modification; and Fig. 6 is an enlarged view of one of the restrictors 61 of Fig. 1.

Referring now to Fig. 1, I have shown a dynamoelectric machine of the inductor type in the form of an eddy current dynamometer provided with a multiple tooth rotatable member 10 mounted on a shaft 11 which is assumed rotatably supported adjacent each end thereof by anti-friction ball bearings such as 12 each mounted in a bearing housing formed by an end frame 13 and bearing cap 14 both associated with the so-called "stator" portion of the machine which is rotatably supported or cradled by trunnion bearings one of which is indicated generally at 15 and which is in turn supported by a bearing pedestal indicated generally at 16. There is thus provided a cradling support for the machine "stator" which includes a stator core 17 of magnetic material and adapted to be excited by a toroidal field exciting winding 18 affixed to the stator core but arranged to be surrounded on three sides by the rotatable member 10. As is conventional, the dynamometer may be cooled by water flowing through pipes 19 embedded in the stator core.

In this type machine, the slotted rotatable member 10 is adapted to induce eddy currents in the stator to absorb energy which is supplied to the rotatable member through the shaft 11 as from a prime mover engine under test (not shown). Dynamoelectric reaction between the two members tends to turn the stator core 17 and measurement of the turning force is made by a spring scale or other apparatus (not shown) as an indication of the torque output of the engine or other equipment under test.

As will be more apparent from later consideration of other figures of the drawing, the trunnion bearing 15 which cradles the stator core within the pedestal 16 comprises respectively semi-spherically and socket shaped inner and outer races 20 and 23. However, as may be more apparent from consideration of Fig. 2, the raised center of the semi-spherical or convex peripheral portion 21 of member 20 is cut away at the top to provide an axially extending flat portion 22 over an extent of more than 180°. Where the raised center portion 21 exists, however, a mating bearing surface is provided by a concave or channel shaped periphery 24 of outer bearing race 23. The sides of the channel provided by concave periphery 24 are cut away at the top of the bearing over more than 180° to allow inter-fitting of the solid bearing races. This feature of cutting away the sides of one and the center of another of mating concave-convex bearing surfaces so that both races may be made solid is not my sole invention and is described and claimed in copending application Serial No. 246,620, filed September 14, 1951, and now abandoned, in the name of Phil S. Potts and Francis M. Metrailer, entitled "Machine Bearing" and assigned to the assignee of the present invention.

The mating bearing peripheries 21 and 24 are provided with a small clearance therebetween and, as is apparent from the drawing, the outer race 23 is loosely held against rotation as by an aligning pin 25 provided with a very loose fit with an aligning hole 26 in race 23 and extending thereinto while secured in a bearing supporting portion 27 of pedestal 16.

As shown in Fig. 2, the pedestal comprises a split bearing housing comprising the base supporting portion 27 and a separate upper clamping portion 28 passing around the outer bearing race 23 with portions 27 and 28 secured together as by machine screws 29 (Fig. 2). If desired, and as shown in Fig. 1, an end ring 30 may be secured to supports 27 and 28 as by a plurality of screws 31 to restrain the outer bearing race against axial movement with respect to the pedestal. The inner bearing race 20 is slipped on, or shrunk on, over a flat outer periphery 32 of an axially extending nose portion 33 of end cap 14 and may be held thereon against axial movement with respect to the cradled portion of the machine by an end ring 34 secured as by screws 35 to the nose portion 31. If desired, and as shown at 36 and 37 in Fig. 1, labyrinth seals may be provided between the relatively rotating parts of the trunnion bearing supports. As shown in the drawings, the pedestal bearing support portion 27 is supported by uprights 38 and 39 welded to a floor or base 40.

In accordance with the present invention, I provide means for supplying a concentrated pressure at circumferentially spaced points along the peripheries of the mating bearing members and, in the illustrated embodiment of Figs. 1–4, the inner periphery 24 of the outer race 23 is recessed or indented at two circumferentially spaced points, one in each of the lower quadrants and equally spaced at either side of the vertical center of the machine, to provide fluid pad chambers 41 and 42 (see Fig. 2). Conduit means 43 and 44, respectively, which may be drilled holes, extend through the outer bearing race in a radial direction to provide communication between these pad chambers and mating recesses 45 and 46, respectively, formed in the pedestal bearing supporting portion 27. Conduit means which, as illustrated, include bores 47 and 48 (in the bearing support 27) nipples 49 and 50, elbows 51 and 52, and conduit 53 and 54, communicate between chambers 45 and 46 and elbows or T connectors 55 and 56, respectively, which communicate through conduits 57 and 58, respectively, with a common supply T, 59, adapted to be fed from a common source of lubricant under pressure, said source including a supply conduit 60.

Thus it is seen that the outer bearing race inner concave surface has in each lower quadrant, on either side of a plane through the axis of the bearing, a chamber adapted to provide a fluid supporting pad for the inner bearing race, conduit means for supplying a lubricant under pressure being provided and extending through the outer bearing race to each of the pressure pad chambers and therefrom to the clearance between the peripheries of the two bearing races when their mating surfaces are in operative position. With any tendency of the shaft, and hence the inner bearing race, to be forced radially off-center with respect to the supporting pedestal and the outer bearing supporting race, there is a tendency to close off the pad cavity at one side, and allow a greater flow of lubricant from the pad cavity through the increased clearance at the other side. I have found it desirable to provide equal restricting tubes in each of the separate fluid pressure lines feeding the separate pad chambers. Such restricting tubes are represented at 61 in Fig. 2 and one is shown enlarged in the detail of Fig. 6, where 56 represents an elbow or T provided with a pipe plug 62 and fed from conduit 58 and feeding conduit 54. In conduit 58 there is inserted a smaller conduit or restrictor tube 61 having at least one bore (such as 63) having a length substantially greater than its diameter and properly proportioned to provide the desirable amount of fluid restriction so that if the flow to either pad chamber 41 or 42 is lessened, flow of fluid to the other chamber is suitably restricted to allow a restoring force at the first pad and correct the misalignment.

I have found it desirable in some applications to apply the same principle, described above in connection with radial alignment, to axial alignment of inner race with respect to outer race, and this is also shown in the arrangement of Figs. 1–4. Fig. 3 is an enlarged sectional view, of some of the parts, on the line 3—3 of Fig. 2, and Fig. 4 is a similar view on the line 4—4 of Fig. 2. In these figures like parts have been like numbered (as in Figs. 1 and 2) and in Figs. 3 and 4 it is seen that pad chamber 41 is disposed to the right of a center plane transverse to the axis of the machine whereas the other chamber 42 is disposed equi-distant to the left of the same center plane so that the fluid pads whenever formed in the respective chambers operate in conjunction with the restricting tubes to preserve axial alignment of the supported member with respect to the supporting member.

Because of the clearance between inner and outer bearing races, fluid will continually flow from the pad indentations into the clearance, and from there out of the bearings at the axial ends of the outer race. In order to conduct this fluid away from the bearing, so that new fluid may be continually supplied through the restricted orifices, the pedestal bearing supporting portion 26 is cut out underneath the mating bearing races and adjacent the front and back end of the outer bearing race (as indicated in Figs. 1–4) to provide a front vertical channel 64 and back vertical channel 65 arranged respectively in front and in back of a mid-supporting portion of the pedestal bearing supporting portion 27. As indicated by arrows 66 (Fig. 2) fluid under pressure entering through conduit 60 passes through the branch conduits 57 and 58 and through the restricting tubes 61 into the conduits 53 and 54 and eventually to the offset bearing pads 41 and 42 and from there as indicated by arrows 67 through the clearance between the bearing portions and around the front and back ends of the lower part of the outer bearing portion. Front clamp ring 30 is provided with orifices 68 so that exhausted oil may flow through the channels 64 and 65 to the bottom of the pedestal support. In order to contain this exhausted oil, the pedestal support is provided with front and back plates 69 and 70, respectively, and in order that the oil may be drawn off from time to time or continuously from the overflow reservoirs thus provided, there is provided a drain plug 71 at the front of the pedestal as indicated in Fig. 1.

In operation, oil is introduced into the bearing from the ports 45 and 46 into the drilled holes 43 and 44 communicating with the fluid pad forming indentations or chambers 41 and 42 whose circumferential length is shown in Fig. 2 and whose cross section is shown in Figs. 3 and 4. The oil which is introduced into the supply conduit may be at a pressure in the neighborhood of 400 to 600 p. s. i. with the restrictors calculated to give a normal (balanced) drop such that oil in the pad chambers is at a pressure of 250 to 350 p. s. i. and the pressure in the clearance outside the pads at about half this latter value. The dimensions are so chosen that the pad pressure times the area of the pads plus any lifting effect in the clearance is sufficient to lift the cradled element of the dynamometer by the reaction of the oil against the spherical surface of the rotatable part of the bearing. This lifting allows the oil to leak from the pressure pads through the clearance which is created between the rotatable part of the bearing and the fixed part of the bearing. The oil then returns to the sump in the hollow pedestal. Since the rotatable bearing portion is separated from the fixed bearing portion by an oil film, the only friction error or loss in the bearing is the viscous friction of the oil or other fluid used and since relative motion between the outer or inner bearing portions is very small, the viscous friction loss is very low.

If the separate inlets were not restrained and the oil were furnished at constant pressure, it is likely that the rotatable part of the bearing would shift axially forward or back from center in a manner analogous to the radial shifting already referred to and would close off one pressure pad allowing the oil to escape freely through the resulting clearance at the other pressure pad. There would be no restoring force in this event to recenter the cradled bearing portion. To eliminate this possibility and still allow using a single oil supply, the axially offset pads and separate restrictors are provided so that any movement of the center of the inner bearing portion to front or back (as well as to either side) will tend to increase the oil flow through the pressure pad towards which it moves and decrease the oil flow through the pressure pad which is more fully opened thereby. In other words, if inner bearing portion (20) were to move towards chamber 41 the oil flow through the fluid pad therein would be restricted by the small clearance between the bearing race peripheries and the oil flow through the pad in chamber 42 would be increased because of the greater clearance between the bearing portions at 42. However with the restricting tubes, when this happens the tube bore 63 in the elbow 56 becomes a major pressure drop and the tube bore 63 in elbow 55 becomes a minor pressure drop. Since the common pressure supply furnishes the same pressure to both tube bores, the pressure in the pad of chamber 42 will then be less than the pressure in the pad of chamber 41, consequently there will be an unbalanced horizontal restoring force which will tend to move the inner bearing race back to the center of the outer bearing race.

I do not mean to limit the invention to the use of only two pressure pads and obviously as many as desirable can be used. A modification is shown in Fig. 5 in which there is shown an outer bearing race 101 having three equally spaced peripherally extending channel portions 102, assumed shaped to mate with an inner race (not shown) having convex peripheral portions of less circumferential length than the cut out portions 103 interposed between channel portions 102, to the end that solid inner and outer races may be fitted together in accordance with the invention described in the Potts and Metrailer application already referred to. In accordance with the present invention the concave peripheral portions 102 have their bottoms provided with indentations 104 so that when oil is supplied thereto there are provided means for providing fluid pressure pads in each bottom quadrant of the bearing and at the top as well. Holes 105 pass radially through the race 101 to establish communication between pad indentations 104 and the outside of the race 101 which is supported in a split bearing supporting housing comprising an upper half 106 and a lower half 107 with the two halves clamped around the race by bolts 108. A conduit 109 conducts lubricant under pressure from a source (not shown) into the base 107 and through three equally restricting tubes 110 each connected to a different supply hole 105 so that pressure drop to each pad will be dependent upon the flow to each in the manner already described. Excess lubricant is collected in the hollow base and drawn therefrom from time to time, or continually, by a conduit 111.

With any of the arrangements of the invention, lubrication is entirely independent of rotation, and thus it is not necessary to build up an oil film or a lifting pressure by means of rotation. A dynamometer constructed in accordance with the invention is characterized by very low losses and, almost regardless of length of service, inconsequential error due to bearing wear. The use of restricted inlet passages coupled with a plurality of inlets to spaced points about the bearing surfaces allows an automatic centering action which may be applied to radial centering alone (for example to preserve coupling alignment) or to both axial centering (i. e., end thrust control) and radial centering of the cradled member with respect to the pedestal which supports it. Furthermore, the use of the restrictors makes bearing support (or lift) somewhat independent of oil grade and temperature which together determine oil viscosity. While some of the principles of the present invention are equally applicable to straight sleeve or cylindrical bearings, the channelled and spherical shape of the bearings specifically described allows perfect end thrust control while at the same time permitting tilting of one member with respect to the other so that the bearing is self aligning.

While I have illustrated and described particular embodiments of my invention, modifications thereof will occur to those skilled in the art. I desire it to be understood, therefore, that my invention is not to be limited to the particular arrangements disclosed and I intend in the appended claims to cover all changes and modifications which do not depart from the true spirit and scope of my invention.

What I claim as new and desire to secure by Letters Patent of the United States is:

1. In a machine for making force measurements and having at least one pedestal member and a cradled member supported for limited rotational movement in said pedestal member, an outer bearing race solidly held in said pedestal member and having an inner periphery a portion of which is generally semi-spherical and concave in axial extent, an inner bearing race secured to said cradled member and having an outer periphery a portion of which is generally semi-spherical and convex in axial extent and nested in said outer bearing race inner periphery portion with a clearance therebetween to permit only limited axial movement while permitting freedom of rotation and axial tilting of said cradled member with respect to said pedestal member, said outer bearing race having pressure pad chambers located as indentations, one in each lower quadrant on either side of a plane through the center of the bearing and in said semi-spherical concave peripheral portion, separate conduit means connecting with each of said chambers and extending through said outer race and through said pedestal, said conduit means including flow restricting means of fixed dimensions in the flow path to each of said chambers, and a common supply of lubricant under pressure connected to all of said separate conduit means so that said inner race may be supported and centered in said outer race by said lubricant passing through said pad chambers and into said clearance.

2. In a machine for making force measurements and having at least one pedestal member and a cradled member supported for limited rotational movement with respect to said pedestal member, a bearing comprising a race fixed with respect to said pedestal member and a race fixed with respect to said cradled member, one of said bearing races having an outer peripheral portion semi-spherical shape, the other of said bearing races having an inner peripheral portion of socket shape adapted to accommodate said outer periphery of semi-spherical shape with a clearance therebetween, one of said races having its said peripheral portion provided with race indentations defining chambers spaced around the circumference thereof, means for supplying lubricant under pressure to said chambers to act as a fluid bearing pad for supporting one of said bearing races with respect to the other, said last-mentioned means including flow restricting means of fixed dimensions constructed and arranged one in each of separate feed conduits supplying the respective chambers so that when one chamber is blocked off a predetermined amount of restriction will likewise be imposed on flow of lubricant to any other chamber thereby to aid in centering of said bearing races and said members with respect to one another.

3. A force measuring instrument bearing assembly comprising bearing inner and outer races relatively rotatable peripherally about a common axis with said bearing inner race having an outer semi-spherical peripheral portion and said bearing outer race having an inner peripheral portion of concave shape designed to mate with said semi-spherical peripheral portion with a clearance therebetween, means for supplying lubricant under pressure at circumferentially-spaced points around one of said peripheral portions, said means including indentations forming chambers in said one peripheral portion, separate conduit means providing communication to each of said chambers and having separate restrictor means of fixed dimensions located therein with all of said restrictor means constructed and arranged to apply equal restrictions to equal flows of fluid therethrough, and fluid pressure supply means communicating with all of said conduit means for providing a fluid under pressure thereto so that one of said mating bearing members may be supported by the other through said fluid under pressure which will also serve to provide a resistance to relative movement of one of said races with respect to the other through said clearance.

4. In a dynamometer having a pedestal member and a cradled member supported for limited rotational movement in said pedestal member, a trunnion bearing comprising an outer race fixed with respect to said pedestal and having an inner peripheral portion concave in axial extent and comprising an inner bearing race having an outer peripheral portion convex in axial extent and nested in said outer race inner peripheral portion with a clearance therebetween, said outer race inner peripheral portion being provided with indentations forming fluid pressure pad chambers equally circumferentially spaced with respect to the radial load center of the bearing, said indentations forming fluid pressure pad chambers one on each side of said load center radially and also forming fluid pressure pad chambers one on each side of a plane passing through the axial center of said bearing and perpendicular to the axis of said bearing so that said pads will be offset axially as well as radially, and separate restrictor means associated with each of said separate conduit means to each of said pad chambers, means for supplying a lubricant under pressure to said pedestal, and separate conduit means extending through said pedestal and said outer race and connecting said supply means with each of said pressure pad chambers, whereby said dynamometer may be characterized by small measurement error, small friction loss, long life and independence of lubrication on relative rotation between mating bearing members.

References Cited in the file of this patent

UNITED STATES PATENTS

| | | |
|---|---|---|
| 466,645 | Wood | Jan. 5, 1892 |
| 2,004,783 | Doran | June 11, 1935 |
| 2,290,213 | Shafer | July 21, 1942 |
| 2,397,164 | Shafer | Mar. 26, 1946 |
| 2,449,297 | Hoffer | Sept. 14, 1948 |
| 2,578,712 | Martellotti | Dec. 18, 1951 |
| 2,621,086 | King | Dec. 9, 1952 |

Dedication 2,712,965.—*Phil S. Potts, Fort Wayne, Ind.* DYNAMOMETER TRUNNION BEARING. Patent dated July 12, 1955. Dedication filed Aug. 16, 1957, by the assignee, *General Electric Company*.

Hereby dedicates to the public the terminal part of the term of said patent.
[*Official Gazette September 17, 1957.*]